(12) United States Patent
Chen

(10) Patent No.: US 7,447,825 B2
(45) Date of Patent: Nov. 4, 2008

(54) PCI-E AUTOMATIC ALLOCATION SYSTEM

(75) Inventor: Kun-Fu Chen, Taipei (TW)

(73) Assignee: Inventec Corporation (TW)

( * ) Notice: Subject to any disclaimer, the term of this patent is extended or adjusted under 35 U.S.C. 154(b) by 291 days.

(21) Appl. No.: 11/373,724

(22) Filed: Mar. 10, 2006

(65) Prior Publication Data

US 2007/0214301 A1    Sep. 13, 2007

(51) Int. Cl.
*G06F 13/40*    (2006.01)

(52) U.S. Cl. ..................... 710/307; 710/301

(58) Field of Classification Search ............. 710/300, 710/305–307, 311, 313, 301
See application file for complete search history.

(56) References Cited

U.S. PATENT DOCUMENTS 5,636,347 A * 6/1997 Muchnick et al. .......... 710/302
2007/0038794 A1 * 2/2007 Purcell et al. .............. 710/306

* cited by examiner

*Primary Examiner*—Clifford H Knoll
(74) *Attorney, Agent, or Firm*—Peter F. Corless; Steven M. Jensen; Edwards Angell Palmer & Dodge LLP

(57) ABSTRACT

A PCI-E automatic allocation system which essentially consists of a detection module and a switch module, wherein the detection module detects the states of the logic signals on the ground pins of a first PCI-E slot with large lane width and a second PCI-E slot with small lane width in a computer system, to determine whether the first and second PCI-E slots hold any inserted expansion card; if the detection module detects an inserted expansion card in the first PCI-E slot rather than the second PCI-E slot, a switch control signal output is generated, to control the switch operation performed by the switch module, that is, transferring lane availability from the second PCI-E slot to the first PCI-E slot, with a view to enhancing the use of PCI-E lanes, speeding up data transmission, and overcoming a known drawback of PCI-E buses, that is, inflexible design.

5 Claims, 1 Drawing Sheet

PCI-E AUTOMATIC ALLOCATION SYSTEM

BACKGROUND OF THE INVENTION

1. Field of the Invention

The present invention relates to a PCI-E automatic allocation system, and more particularly, to a system applied in a computer system to allocate lanes for PCI-E buses.

2. Description of the Prior Art

With constant advancement of electronic and computer technology, resultant computer functions are not only increasingly powerful but also subject to upgrades or supplements emerging in the presence of new accompanying peripherals. However, upon the introduction of any new accompanying peripheral, the computer has to be restarted in order to finalize the installation of the peripheral, and in consequence it necessitates interrupting current operations. The aforesaid practice is both intricate and inconvenient, and it could have a devastating consequence, such as data loss or service interruption, especially in the case of those devices with strict persistence and reliability requirements, for example, servers.

Accordingly, early on, the industry put forth a technology, Peripheral Component Interconnection (hereinafter referred to as PCI), characterized by its hot swap function to serve as an I/O interface for a computer. PCI, a bus standard widely supported by computer systems nowadays, is an interconnection mechanism specially designed for peripherals with high bulk density, expansion cards, and processor/memory systems, and configured to incorporate various expansion cards, hard disks or CD-ROMs into a system and provide two-way communication between two devices, as well as between a device and a system memory/processor. Its most important feature is that it enables users to update, change or add PCI peripherals without turning off or suspending the operating system but in an online manner instead, and apply an update, change or addition without restarting the operating system. As a result, it greatly reduces scheduled or nonscheduled suspension duration, maximizes its availability, and greatly enhances computer performance.

An interface developed and released by Intel over a decade ago, the known PCI bus is operated in a 33 MHz, 32-bit environment, with a peak theoretical bandwidth of 132 MB per second. It uses a shared bus topology—bus bandwidth is shared among multiple devices—to enable communication among the different devices on the bus. As devices evolved, new bandwidth hungry devices began starving other devices on the same shared bus. Gigabit LAN cards, for example, can monopolize up to 95% of available PCI bus bandwidth. As a result, networking speed is inevitably compromised. More badly, with other computer accessories being upgraded, current PCI technology is becoming less fit to meet the computer system requirements, thus prompting the advent of a new technology which will substitute for the existing PCI technology and supply more bandwidth to a computer system.

To provide the bandwidth required by these modem devices, PCI Express was developed by an industry consortium of PC and peripheral vendors and began shipping in standard desktop PCs in 2004. Already, most desktop machines from the leading suppliers include at least one PCI Express (hereinafter referred to as PCI-E) slot. Compared to PCI, PCI-E performs data transmission by means of serial connection, point-to-point connection, and Low Voltage Differential Signaling (LVDS), and its advantages are, namely enhanced data transmission and reduced noise. With PCI-E standard technology, a basic PCI-E connection is defined as two LVDS pairs, one for sending signals, the other for receiving signals. Connection as such is defined as a lane, which enables 250 MBytes/s bandwidth per direction, per lane. The more lanes there are, the greater is the bandwidth provided by PCI-E.

Also, unlike PCI which divides bandwidth between all devices on the bus, PCI-E provides each device with its own dedicated data pipeline. Data is sent serially in packets through pairs of transmit and receive signals called lanes, Multiple lanes can be grouped together into ×1 ("single-lane"), ×2, ×4, ×8, ×12, ×16, and ×32 lane widths to increase bandwidth allocated to the slot. PCI-E dramatically improves data bandwidth compared to legacy buses, minimizing the need for onboard memory and enabling faster data streaming.

As mentioned above, the bandwidth provided by PCI-E depends on the number of PCI-E lanes available. For instance, as regards computer-specific motherboards nowadays, in general, it is the design of a hardware circuit which specifies the way in which PCI-E lanes are connected to the PCI-E slots of a computer-specific motherboard to determine a fixed bandwidth that PCI-E provides for each PCI-E slot. For instance, where a PCI-E ×4 slot and a PCI-E ×8 slot are installed on a computer-specific motherboard, and a PCI-E bus is associated with eight lanes which are evenly allocated to the PCI-E ×4 slot and the PCI-E ×8 slot, to facilitate the fast data streaming carried out between the memory of a computer and the dedicated lanes of the expansion cards inserted in the PCI-E ×4 slot and the PCI-E ×8 slot. However, in a situation where an expansion card is inserted in the PCI-E ×8 slot rather than the PCI-E ×4 slot, the aforesaid rule, that is, the PCI-E lanes being evenly allocated to the PCI-E ×4 slot and the PCI-E ×8 slot, makes the lanes associated with PCI-E ×4 slot idle, and in consequence part of the PCI-E lanes are not efficiently used; hence, resultant disadvantages are, namely slow data transmission, a waste of I/O bandwidth of the PCI-E bus, and inflexible PCI-E bus design.

Accordingly, an issue that currently confronts the industry and needs urgent solution involves developing a PCI-E automatic allocation technology to promote efficient use of PCI-E lanes and overcome the drawbacks of the prior art, such as inefficient use of PCI-E lanes arising out of inflexible allocation of PCI-E lanes, slow data transmission, and inflexible PCI-E bus design.

SUMMARY OF THE INVENTION

Accordingly, to overcome the drawbacks of the aforementioned prior art, it is a primary objective of the present invention to provide a Peripheral Component Interconnection Express (PCI-E) automatic allocation system to enhance the use of PCI-E lanes and speed up data transmission.

Another objective of the present invention is to provide a PCI-E automatic allocation system to overcome a known drawback of conventional PCI-E bus, that is, its inflexible design.

In order to achieve the above and other objectives, a PCI-E automatic allocation system is provided according to the present invention. The PCI-E automatic allocation system works in a computer system having at least one first PCI-E slot with large lane width and one second PCI-E slot with small lane width, each having a ground pin, with the PCI-E lanes being selectively allocated to the first and second PCI-E slots. The PCI-E automatic allocation system comprises a detection module configured to detect the states of the logic signals on the ground pins of the first and second PCI-E slots and determine whether the first and second PCI-E slots hold any inserted expansion card; if the detection module detects an expansion card in the first PCI-E slot rather than the second PCI-E slot, a switch control signal output is generated. The PCI-E automatic allocation system further comprises a switch module configured to perform a switch operation based on the switch control signal outputted by the detection module, such that PCI-E lanes previously assigned to the second PCI-E slot are reassigned to the first PCI-E slot.

In the present invention, the detection module further comprises at least two detection units connected to the first and second PCI-E slots respectively and configured to detect the states of the logic signals on the ground pins of the first and second PCI-E slots respectively, and a switch control signal generation unit for generating a switch signal output whenever the detection module detects an expansion card in the first PCI-E slot rather than the second PCI-E slot and controlling the corresponding switch operation performed by the switch module.

Furthermore, in the present invention, if the detection module does not detect any expansion card in the first PCI-E slot, then the detection module generates and sends a state retention signal to the switch module to stop the switch module from performing any switch operation and keep the switch module staying in the current state.

Furthermore, in the present invention, the foresaid detection units are detection circuits composed of transistors, buffers, the peripheral electronic components thereof, and lines.

Compared with the prior art, the PCI-E automatic allocation system of the present invention uses a detection module to detect the states of the logic signals on the ground pins of a first and second PCI-E slots in a computer system, so as to determine whether the first and second PCI-E slots hold any expansion card; if the detection module detects an expansion card in the first PCI-E slot rather than the second PCI-E slot, then a switch control signal is generated to control the switch operation performed by a switch module, that is, transferring lane availability from the second PCI-E slot to the first PCI-E slot. Hence, according to the present invention, PCI-E lanes previously assigned to the second PCI-E slot with small lane width are reassigned to the first PCI-E slot with large lane width, so as to speed up data transmission between the expansion card inserted in the first PCI-E slot and the computer system, use PCI-E lanes efficiently, and overcome the drawbacks of the prior art, such as inefficient use of PCI-E lanes arising out of fixed connection between a PCI-E lane and a PCI-E slot, slow data transmission, and inflexible PCI-E bus design.

DETAILED DESCRIPTION OF THE PREFERRED EMBODIMENTS

Figure 1:
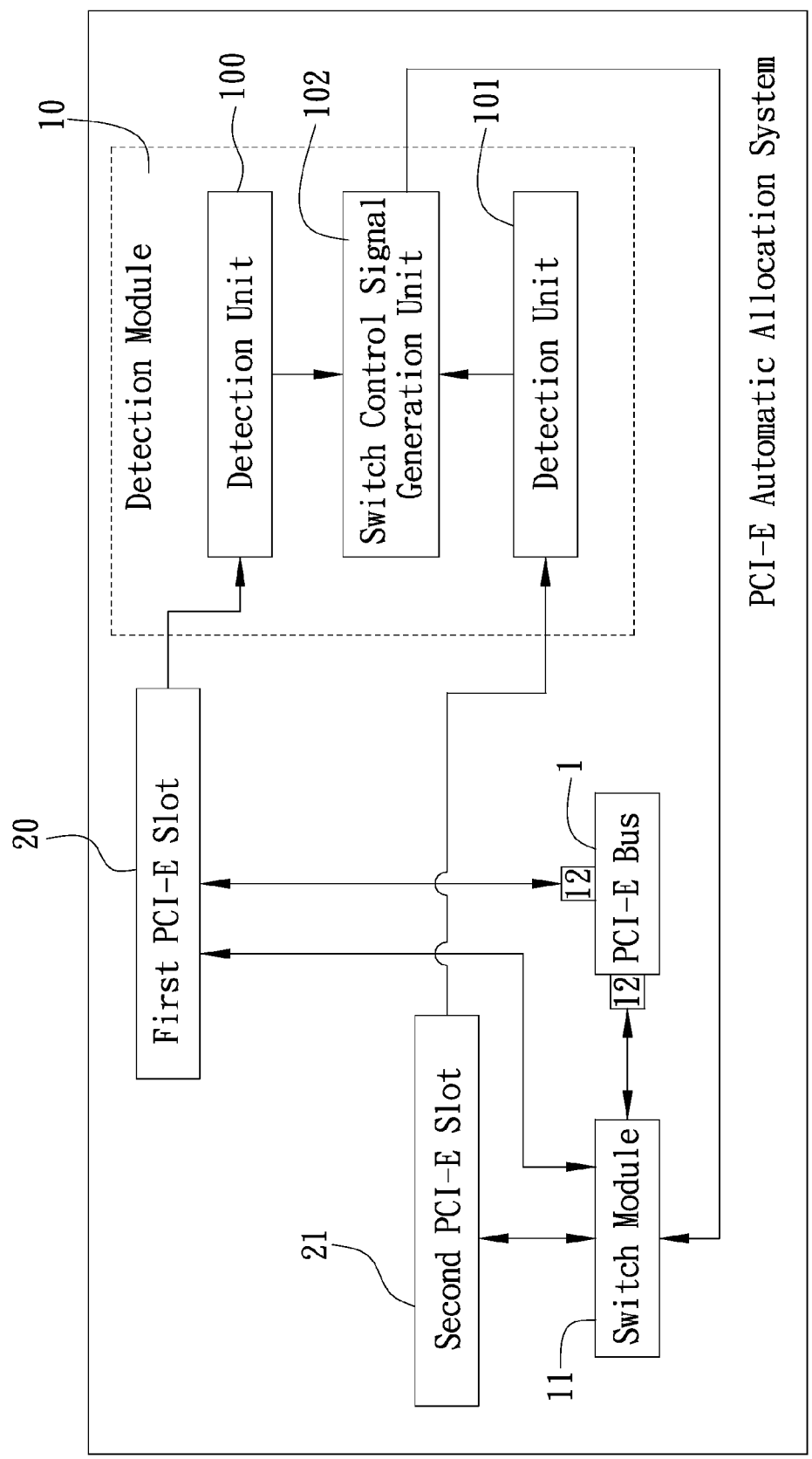
FIG. 1 is a block diagram of the structure of a PCI-E automatic allocation system according to the present invention.

The following specific embodiments are provided to illustrate the present invention. Others skilled in the art can easily understand other advantages and features of the present invention in accordance with the contents disclosed in this specification. The present invention can also be performed or applied by other different embodiments. Various modifications and changes based on different viewpoints and applications yet still within the scope of the present invention can be made in the details of the specification.

Referring to FIG. 1, which is a block diagram of the structure of a PCI-E automatic allocation system according to the present invention. The PCI-E automatic allocation system of the present invention is applied in a computer system (not shown). The computer system comprises at least two PCI-E slots; the first and second PCI-E slots 20 and 21 are herein illustrated with a diagram, to simplify illustration and explanation. In addition, the computer system is one selected from the group consisting of a CPU, northbridge chip or southbridge chip.

As regards the first and second PCI-E slots 20 and 21 in the present invention, each has, for example, a single lane (×1), two lanes (×2), four lanes (×4), eight lanes (×8), or sixteen lanes (×16), and both are equipped with a ground (GND) pin. The first PCI-E slot 20 differs from the second PCI-E slot 21 in lane width. An example, where the first and second PCI-E slots 20 and 21 are a PCI-E ×8 slot and a PCI-E ×4 slot respectively, is schematically described below, though the example should not be construed as to limit the scope of the present invention in any way. In the present invention, a PCI-E bus 1 has eight lanes 12 which are evenly allocated to the first and second PCI-E slots 20 and 21 whenever both the first and second PCI-E slots 20 and 21 are occupied by expansion cards and are operating.

Referring to FIG. 1 further, the PCI-E automatic allocation system comprises a detection module 10 and a switch module 11. The detection module 10 and the switch module 11 are respectively elaborated as follows.

The detection module 10 detects the states (e.g. logic 0 or logic 1) of the logic signals on the ground (GND) pins of the first and second PCI-E slots 20 and 21 and determines whether the first and second PCI-E slots 20 and 21 hold any inserted expansion card; if the detection module 10 detects an expansion card in the first PCI-E slot 20 rather than the second PCI-E slot 21, a switch control signal output is generated. In the present invention, the first and second PCI-E slots belong to a kind of slots in which an expansion card is inserted. The expansion card is one selected from the group consisting of a floppy disk drive, hard disk drive, CD-ROM, CD-R/W, DVD, sound card, and network interface card.

In the present invention, once an expansion card is inserted into the first and second PCI-E slots 20 and 21, the ground pins for the first and/or second PCI-E slots 20 and 21 come into contact with that for the superimposed expansion card (i.e. the gold finger taking care of the ground signals of the expansion card) and therefore connect the ground pin of the expansion card to a corresponding line in the computer system to form a signal transmission path. If the computer system configures the ground pin to have low potential level by default, that is, a valid logic 0, then a logic 0 signal is generated on the ground pins of the first and second PCI-E slots 20 and 21 whenever an expansion card is inserted in the first and second PCI-E slots 20 and 21; conversely, a logic 1 signal is generated on the ground pins of the first and second PCI-E slots 20 and 21, if no expansion card is inserted in the first or second PCI-E slot 20 or 21 but there is floating of the ground pins of the first and second PCI-E slots 20 and 21.

As mentioned above, with the states of the logic signals output by the ground (GND) pins of the first and second PCI-E slots 20 and 21 (for example, a logic 0 or logic 1), the detection module 10 determines whether an expansion card is found in the first and second PCI-E slots 20 and 21. For instance, if the detection module 10 detects a logic 1 outputted by the ground pin of the first PCI-E slot 20 as well as a logic 0 outputted by the ground pin of the second PCI-E slot 21, then the detection result indicates that no expansion card is inserted in the first PCI-E slot 20, and that an expansion card is inserted in the second PCI-E slot 21, and in consequence, based on its detection result, the detection module 10 generates a switch signal and outputs the signal to the switch module 11 to be executed by the switch module 11.

Furthermore, if the detection module 10 detects a logic 0 outputted by the ground pins of the first and second PCI-E slots 20 and 21, then the detection result indicates that expansion cards are inserted in both the first and second PCI-E slots 20 and 21. Also, if the detection module 10 detects a logic 1 outputted by the ground pin of the first PCI-E slot 20 as well as a logic 0 outputted by the ground pin of the second PCI-E slot 21, then the detection result indicates that no expansion card is inserted in the first PCI-E slot 20, and that an expansion card is inserted in the second PCI-E slot 21. Again, if the detection module 10 detects a logic 1 outputted by the ground pins of the first and second PCI-E slots 20 and 21, then the detection result indicates that no expansion card is inserted in the first or second PCI-E slot 20 or 21. Based on one of the three above-mentioned detection results, the detection module 10 generates a state retention signal and outputs the signal to the switch module 11 to be executed by the switch module 11.

The switch module 11 receives a switch signal or a state retention signal from the detection module 10. Based on the switch signal or the state retention signal it receives, the switch module 11 proceeds to perform a switch operation, or the switch module 11 declines to perform any switch operation but maintains status quo. More specifically, if the detection module 10 detects a logic 0 outputted by the ground (GND) pin of the first PCI-E slot 20 as well as a logic 1 outputted by the ground (GND) pin of the second PCI-E slot 21, then the detection result indicates that no expansion card is inserted in the first PCI-E slot 20, that an expansion card is inserted in the first PCI-E slot 20, and that no expansion card is inserted in the second PCI-E slot 21, and in consequence the switch module 11 performs a switch operation according to a switch signal outputted by the detection module 10, to transfer availability of PCI-E 1 lanes from the second PCI-E slot 21 to the first PCI-E slot 20, and connect all the PCI-E 1 lanes to the first PCI-E slot 20 such that an expansion card installed in the first PCI-E slot 20 may be connected to the computer system (e.g. the memory of the computer system) via all the lanes provided by the PCI-E 1, with a view to speeding up data transmission between the expansion card and the computer system, enhancing the use of PCI-E lanes, and achieving effective sharing of PCI-E enabled bandwidth.

If the detection module 10 detects a logic 1 outputted by the ground (GND) pin of the first PCI-E slot 20 as well as a logic 0 outputted by the ground (GND) pin of the second PCI-E slot 21, then the detection result indicates that no expansion card is inserted in the first PCI-E slot 20, and that an expansion card is inserted in the second PCI-E slot 21. However, as mentioned above, the second PCI-E slot 21 is a 4-lane slot and has already been connected to four lanes, thus the detection module 10 generates a state retention signal and outputs the signal to the switch module 11 such that the switch module 11 does not perform any switch operation but maintains status quo. Again, if the detection module 10 detects a logic 1 outputted by the ground (GND) pin of the first PCI-E slot 20 and a logic 1 outputted by the ground (GND) pin of the second PCI-E slot 21, or in a similar scenario, if a detection unit 100 detects a logic state 0 outputted by the ground (GND) pin of the first PCI-E slot 20, whereas a detection unit 101 detects a logic state 0 outputted by the ground (GND) pin of the second PCI-E slot 21, then the detection result indicates that no expansion card is inserted in the first or second PCI-E slot 20 or 21; in response to the detection result, the detection module 10 generates a state retention signal and outputs the signal to the switch module 11 such that the switch module 11 does not perform any switch operation but maintains status quo. Hence, the present invention enhances the efficient use of PCI-E 1 lanes, speeds up data transmission, and overcomes a drawback of the know PCI-E design, that is, inflexibility.

In the present invention, the aforesaid detection module 10 comprises at least two detection units 100 and 101, and one switch control signal generation unit 102. The detection units 100 and 101, and the switch control signal generation unit 102 are elaborated below.

The detection units 100 and 101 are connected to the first and second PCI-E slots respectively and configured to detect the states (0 or 1) of the logic signals outputted by the ground (GND) pins of the first and second PCI-E slots 20 and 21 respectively, determine whether any expansion card is found in the first and second PCI-E slots 20 and 21 respectively, produce detection results respectively, and output them to the switch control signal generation unit 102 such that the switch control signal generation unit 102 processes the detection results it receives. If the detection unit 100 detects a logic state 0 outputted by the ground (GND) pin of the first PCI-E slot 20, whereas the detection unit 101 detects a logic state 1 outputted by the ground (GND) pin of the second PCI-E slot 21, then, based on the detection results of the detection units 100 and 101, the switch control signal generation unit 102 generates a switch control signal and outputs the signal to the switch module 11 to make the switch module 11 perform a switch operation whereby availability of PCI-E 1 lanes is transferred from the second PCI-E slot 21 to the first PCI-E slot 20. If the detection unit 100 detects a logic state 1 outputted by the ground (GND) pin of the first PCI-E slot 20, whereas the detection unit 101 detects a logic state 0 outputted by the ground (GND) pin of the second PCI-E slot 21, then, based on the detection results of the detection units 100 and 101, the switch control signal generation unit 102 generates a state retention signal and outputs the signal to the switch module 11 such that the switch module 11 does not perform any switch operation but maintains status quo. If the detection unit 100 detects a logic 1 outputted by the ground (GND) pin of the first PCI-E slot 20, whereas the detection unit 101 detects a logic 1 outputted by the ground (GND) pin of the second PCI-E slot 21, or in a similar scenario, if the detection unit 100 detects a logic state 0 outputted by the ground (GND) pin of the first PCI-E slot 20, whereas the detection unit 101 detects a logic state 0 outputted by the ground (GND) pin of the second PCI-E slot 21, then, based on the detection results of the detection units 100 and 101, the switch control signal generation unit 102 generates a state retention signal and outputs the signal to the switch module 11 such that the switch module 11 does not perform any switch operation but maintains status quo.

The aforesaid detection units 100 and 101 are detection circuits composed of transistors, buffers, the peripheral electronic components thereof, and lines. However, consideration may be given to practical design needs and thus the constituent components of the aforesaid detection circuits may be replaced by electronic elements or electronic circuits with similar functions. The operating principles of individual constituent components of the aforesaid detection circuits belong to the prior art known to every engineering professional in the industry, thus they are not repeated herein.

In another embodiment of the present invention, where the aforesaid detection module 10 detects an inserted expansion card in both the first and second PCI-E slots, or, in other words, having detected a logic 0 on the ground pins of both the first and second PCI-E slots, then the detection module 10 may proceed to further detect and determine whether the first and second PCI-E slots are functioning; if the detection result indicates that the second PCI-E slot 21 with small lane width is not functioning but the first PCI-E slot 20 with large lane width is, then the switch module 11 transfers lane availability from the second PCI-E slot 21 to the first PCI-E slot 20 with large lane width.

Compared with the prior art, the PCI-E automatic allocation system of the present invention uses the detection module 10 to detect the states of the logic signals on the ground pins of a first and second PCI-E slots 20 and 21 in a computer system, to determine whether the first and second PCI-E slots 20 and 21 hold any inserted expansion card; if the detection module 10 detects an inserted expansion card in the first PCI-E slot 20 rather than the second PCI-E slot 21, then a switch control signal output is generated, to control the switch operation performed by the switch module 11, that is, transferring lane availability from the second PCI-E slot 21 to the first PCI-E slot 20. Hence, according to the present invention, PCI-E lanes previously assigned to the second PCI-E slot 21 with small lane width are reassigned to the first PCI-E slot 20 with large lane width, so as to speed up data transmission between the expansion card inserted in the first PCI-E slot 20 and the computer system, use the PCI-E lanes efficiently, and overcome the drawbacks of the conventional technology, such as inefficient use of PCI-E lanes arising out of fixed connection between a PCI-E lane and a PCI-E slot, slow, data transmission, and inflexible PCI-E bus design.

The aforesaid embodiments merely serve to illustrate the principles and the functions of the present invention. They should not be construed as to limit the scope of the present invention in any way. It will be apparent to those skilled in the art that all equivalent modifications or changes made, without departing from the spirit and the technical concepts disclosed by the present invention, should fall within the scope of the appended claims.

What is claimed is:

1. A Peripheral Component Interconnection Express (PCI-E) automatic allocation system applied in a computer system, wherein the computer system comprises at least one first PCI-E slot with large lane width and one second PCI-E slot with small lane width, said first and second PCI-E slots being equipped with ground pins respectively, with said PCI-E lanes being selectively allocated to said first and second PCI-E slots, said PCI-E automatic allocation system comprising:

a detection module configured to detect states of logic signals on the ground pins of said first and second PCI-E slots and determine whether said first and second PCI-E slots are inserted with any expansion card; if said detection module detects an inserted expansion card in said first PCI-E slot rather than said second PCI-E slot, a switch control signal is generated and outputted; and a switch module configured to perform a switch operation based on the switch control signal outputted by said detection module, such that lanes previously assigned to said second PCI-E slot are reassigned to said first PCI-E slot, wherein upon detecting the absence of an inserted expansion card in said first PCI-E slot, said detection module generates a state retention signal and outputs the signal to said switch module such that said switch module does not perform any switch operation but maintains status quo.

2. The PCI-E automatic allocation system of claim 1, wherein said detection module further comprises:

at least two detection units, said two detection units being connected to said first and second PCI-E slots respectively to detect the states of the logic signals on the ground pins of said first and second PCI-E slots respectively; and a switch control signal generation unit for generating a switch signal output to control a switch operation correspondingly performed by said switch module whenever said detection unit detects an inserted expansion card in said first PCI-E slot rather than said second PCI-E slot.

3. The PCI-E automatic allocation system of claim 2, wherein said detection unit is a detection circuit composed of transistors, buffers, peripheral electronic components thereof, and lines.

4. The PCI-E automatic allocation system of claim 1, wherein said expansion card is one selected from the group consisting of a floppy disk drive, hard disk drive, CD-ROM, CD-R/W, DVD, sound card, and network interface card.

5. The PCI-E automatic allocation system of claim 1, wherein said computer system is one selected from the group consisting of a CPU, northbridge chip and southbridge chip.

* * * * *